March 11, 1941.   E. BERTALAN   2,234,586
ARTICLE COATING MACHINE
Filed June 23, 1938   3 Sheets-Sheet 3
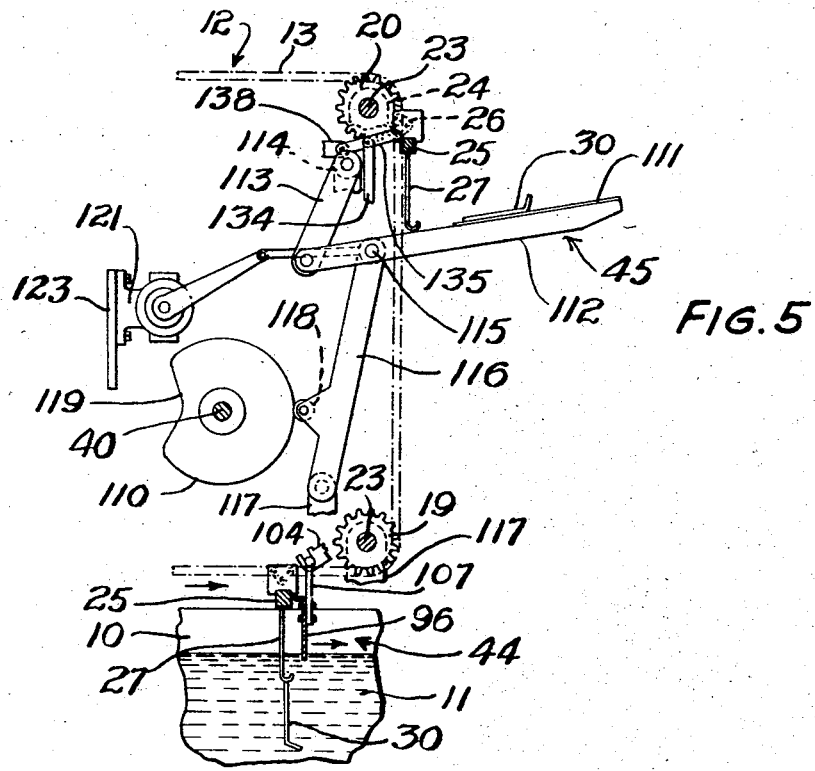
INVENTOR
E. BERTALAN
BY Emery Robinson
ATTORNEY Patented Mar. 11, 1941

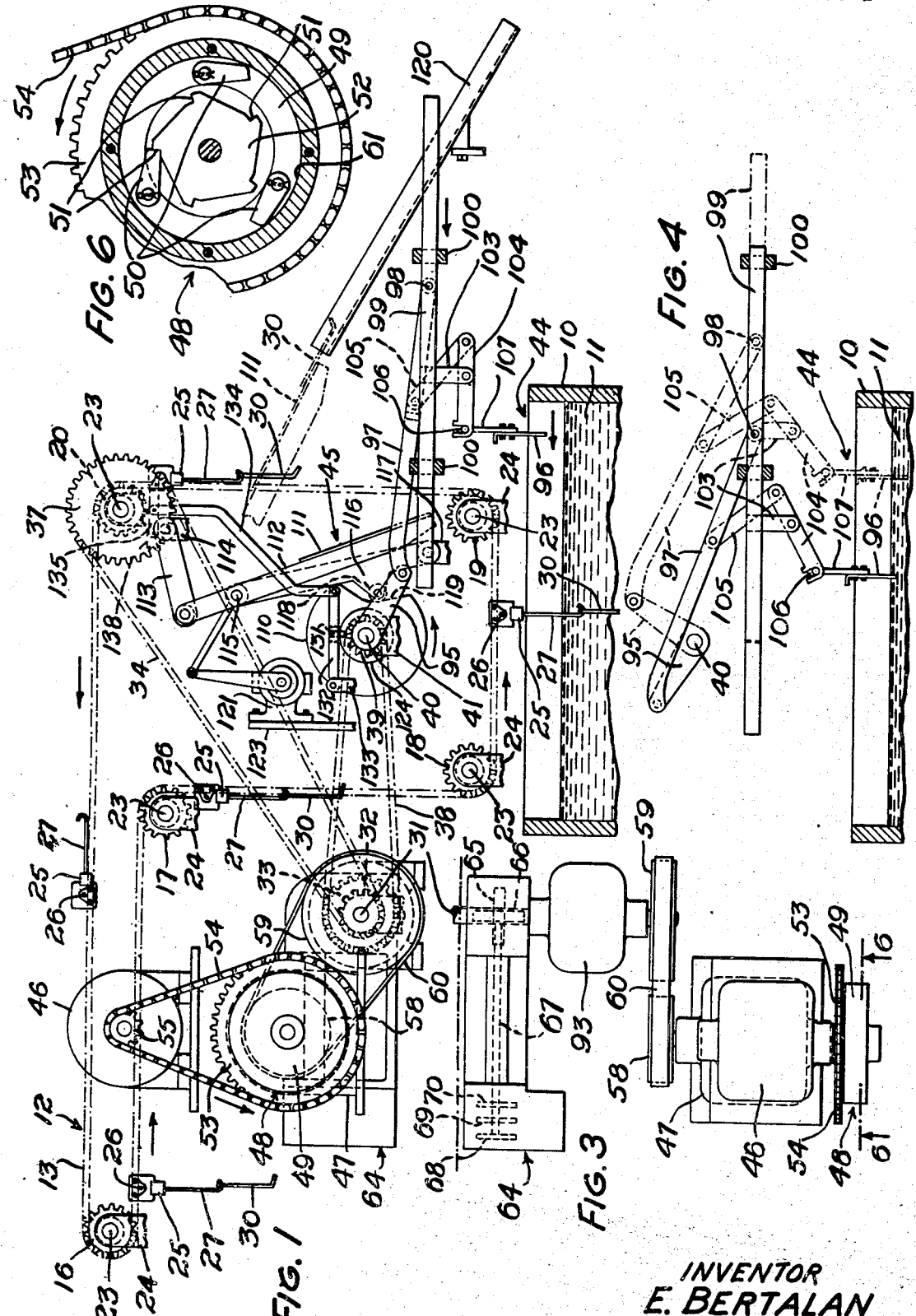

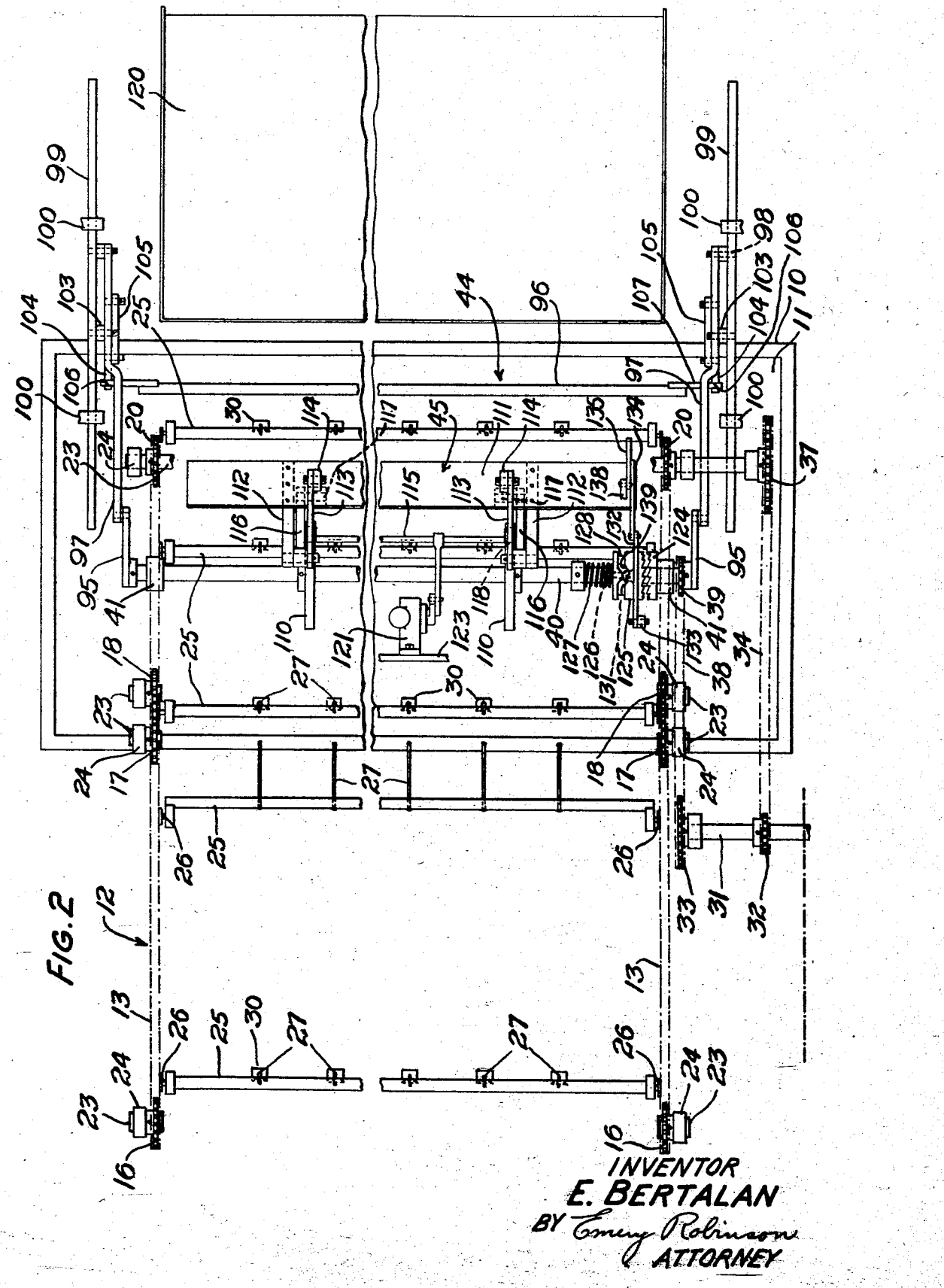

2,234,586

UNITED STATES PATENT OFFICE 2,234,586

ARTICLE COATING MACHINE

Edward Bertalan, Baltimore, Md., assignor to Western Electric Company, Incorporated, New York, N. Y., a corporation of New York Application June 23, 1938, Serial No. 215,320

10 Claims. (Cl. 91—12.6)

This invention relates to article coating machines, and more particularly to an automatic galvanizing or metal coating machine of the type in which articles are immersed in a galvanizing bath for a period of time and then emerged through the surface thereof.

It has been found from practice in the coating of articles by immersion in a bath of coating material, for example, in the galvanizing art, that in order to produce a uniform and thorough coating of the articles a certain sequence of handling operations at predetermined variable speeds should be followed.

An object of this invention is to provide a simple and practical article coating machine for expeditiously automatically subjecting articles to a certain sequence of handing operations whereby a uniform and thorough coating of the articles is effected.

In one embodiment of this invention as applied to a machine for galvanizing articles variable speed conveying means is included for continuously causing successive spaced series of articles to travel to a galvanizing bath, immersing them therein for a predetermined length of time and advancing them while submerged. Means is provided for skimming the surface of the bath of dross in advance of the withdrawal of the articles through the surface thereof. Immediately thereafter the movement of the conveying means is decelerated to slowly emerge the articles through the skimmed surface of the bath until the entire upper ends thereof are above the surface thereof. The movement of the conveying means is then caused to move more rapidly until the lower ends of the articles are approaching the surface of the bath, at which time the movement of the conveying means is again decelerated to permit the excess coating on the articles to properly drain from the articles back into the bath. Upon the lower ends of the articles being emerged from the bath the conveying means is caused to move more rapidly and shortly thereafter a discharge means is actuated to automatically remove the articles from the conveying means and place them in a slightly inclined position on the discharge means with the ends last emerged slightly above the ends which first emerged to prevent the coating from draining to the lower ends and forming excessively thick sections of coating. After a sufficient length of time to permit the coating to harden the discharge means is returned to its normal position, during which movement the coated articles are discharged therefrom by gravity onto a receiving chute.

Other features and advantages of this invention will more fully appear from the following detailed description, taken in connection with the accompanying drawings, in which Fig. 1 is a schematic fragmentary side view, partly in section, of a galvanizing machine embodying the features of this invention;

Fig. 2 is a fragmentary plan view of Fig. 1, an intermediate portion of the machine being broken away to conserve space;

Fig. 3 is a fragmentary plan view of Fig. 1 illustrating portions not shown in Fig. 2, which when placed with Fig. 2 along the broken line at the lower left hand corner of Fig. 2 forms a complete plan view of Fig. 1;

Fig. 4 is a fragmentary side view, similar to Fig. 1, showing several positions assumed by the automatic bath skimming means during its operating cycle;

Fig. 5 is a fragmentary side view, similar to Fig. 1, showing the upper inclined position of the discharge means, which removes the galvanized articles from the travelling conveying means, during its operating cycle;

Fig. 6 is an enlarged vertical section taken on the line 6—6 of Fig. 3 of an over-running clutch included in the driving means for the machine, and Fig. 7 is an electric wiring diagram for controlling and operating the driving motors of the machine whereby the article conveying means is caused to travel continuously at variable speeds.

For the sake of clearness and simplicity in the drawings, most of the framework of the machine and guides for the article conveying means have been omitted and some of the elements shown fragmentarily, since a full understanding of the invention may be had without fully illustrating them.

Referring particularly to Figs. 1 and 2, the numeral 10 indicates a tank containing a bath of molten galvanizing material 11 and arranged thereabove is a continuously moving conveyor 12, comprising two endless aligned sprocket chains 13 (Fig. 2), one adjacent each end of the tank. Each chain meshes with a series of sprocket wheels 16, 17, 18, 19 and 20, and the corresponding wheels of each chain are fixed to shafts 23, journaled in bearing supports 24, the shafts being arranged to cause the conveyor 12 to travel a predetermined endless path, to be referred to hereinafter. Extending between the endless chains 13 and uniformly spaced therearound are a plurality of cross bars 25, five in the present embodiment, which are pivotally connected at opposite ends to the chains by means indicated in general at 26. Attached to each bar 25 are a plurality of hooks 27 for supporting articles 30 to be galvanized. In the movement of the conveyor 12, the hooks 27 will swing downwardly by the action of gravity, the supporting bars 25 freely turning about their pivotal connections 26 to the chains 13, except along the uppermost run (Fig. 1) of the chains between the wheels 16 and 20, during which run the pivotal connections are associated with suitable guides or rails (not shown) which maintain the hooks horizontally, as shown, but which permit them to swing downwardly and outwardly as they pass around the wheels 16 and 20, respectively.

A main continuously rotating drive shaft for the machine is indicated at 31 (Figs. 2 and 3), which has fixed thereto a pair of sprocket wheels 32 and 33. The wheel 32 is operatively connected, by means of a sprocket chain 34, to a sprocket wheel 37, secured to the forward end of the shaft 23, as viewed in Figs. 1 and 2, which shaft extends across the machine and carries the sprocket wheels 20. Thus, the conveyor sprocket chains 13, which mesh with the driving wheels 20, are driven in unison. The wheel 33 is operatively connected by means of a sprocket chain 38 to a sprocket wheel 39, normally freely rotated on a shaft 40, extending across the machine and journalled in bearing supports 41. Receiving motion from the shaft 40, when it is set in motion, is a skimming means, indicated generally at 44, for cleaning the surface of the galvanizing bath 11 of dross just before the articles 30 being carried therethrough emerge from the bath. Also, receiving motion from the shaft 40, is an article discharge means, indicated generally at 45, which automatically removes the articles 30 from the supporting hooks 27 shortly after they emerge from the bath. The bath skimming means and the article discharge means will be fully described hereinafter.

As hereinbefore mentioned, in order to produce a uniform and thorough coating of the continuously moving articles 30, a certain sequence of handling operations at predetermined variable speeds should be followed. To effect this operation of the machine, the main driving shaft 31 thereof receives continuous motion alternately from a pair of electric motors 46 and 47 (Figs. 1, 3 and 7) in the following manner:

Surrounding the shaft of the motor 47, which is adapted to furnish "medium and high speed" operation of the machine, is an overrunning clutch, indicated generally at 48 (Figs. 1, 3 and 6), comprising a pawl supporting wheel 49 fixed to rotate with the shaft of the motor 47 and carrying pivotal pawls 50, the free ends of which are arranged to be received in notches 51 of a ratchet wheel 52 free to rotate on the shaft of the motor. Secured to the ratchet wheel 52 is a sprocket wheel 53, which is operatively connected, by means of a sprocket chain 54, to a sprocket wheel 55 fixed to the shaft of the motor 46, which is used to drive the machine at "low speed." To the opposite end of the motor shaft, with which the overrunning clutch 48 is associated, is secured a pulley 58, which is operatively connected to a pulley 59, fixed to the main drive shaft 31, by a belt 60. It will be apparent that when the "low speed" motor 46 is energized, during which time the "medium and high speed" motor 47 is deenergized, the clutch ratchet wheel 52 will receive motion from the shaft of the motor 46 through the interconnecting sprocket chain drive and due to the free end of at least one of the pivotal pawls 50, carried by the clutch wheel 49 being in position to be engaged by one of the ratchet notches 51, as shown in Fig. 6, that the wheel 49 and the shaft of the motor 47, to which it is secured, will rotate and by means of the pulley and belt drive from the motor shaft to the main drive shaft 31 the latter will thus receive motion. Also, when the motor 47 is energized for operating the machine at either "medium or high speed," during which time the "low speed" motor 46 is deenergized, the pivotal pawls 50 will rotate away from the ratchet notches 51 and thereafter be held out of the path thereof and maintained in close engagement with an inner peripheral wall 61 of the wheel 49 by centrifugal force. When the main drive shaft 31 is being driven by the motor 47, the ratchet wheel 52, which is rotatably free on the shaft of the motor 47, will remain idle and thus no motion is transmitted from the motor 47, tending to rotate the shaft of the deenergized motor 46.

For controlling the energization and deenergization of the windings of the motors 46 and 47 and thereby the sequence and length of time that the machine is operated at "high, low and medium speeds," without stoppage thereof, there is provided a sequence or commutator switch indicated generally at 64 (Figs. 1, 3 and 7). The switch 64 is driven from the main drive shaft 31 by means of a worm gear 65 carried on the shaft 31 meshing with a similar gear 66 carried on a shaft 67 and comprises in the present embodiment three discs 68, 69 and 70 composed of insulating material. As shown schematically in the electrical circuit diagram (Fig. 7) the discs each have fixed thereto an irregularly shaped member 73 of conducting material embedded in and flush with one of its side faces. Associated with each of the disks is a pair of contact brushes, brushes 74 and 75 with disc 68, brushes 76 and 77 with disc 69, and brushes 78 and 79 with disc 70.

The configuration of the conducting members 73 is such that the brushes 75, 77 and 79 are always in engagement with the conducting members 73, whereas each of the brushes 74, 76 and 78 engage the conducting member 73 on its associated disc and are interconnected with its companion brush 75, 77 and 79, respectively, through the associated conducting member at predetermined intervals in the cycle of the machine, as will be described hereinafter. Power is supplied to the two motors 46 and 47 from a 440 volt source 82 and the power will be supplied to the motors in sequence and for predetermined periods of time upon the closure of a switch 83. Switch 83, upon being closed, will complete a circuit to energize a relay 84, which will connect the power source 82 to leads 85, 86 and 87. Lead 86 extends to one side of the winding of three relays 90, 91 and 92 and with the sequence switch discs in the position shown, wherein a "low speed" period of operation of the machine has just been completed, brush 74 will have just moved into engagement with the conducting member 73 of the sequence switch disc 68 and, therefore, a circuit will be completed to energize relay 91 to connect the power source 82 to "high speed" windings of the motor 47 to energize it and thereby drive the machine at "high speed." The relay 91 will be maintained energized until the sequence switch disc 68 has moved to a position where brush 74 will no longer engage the conducting member 73 of the disc and at that instant brush 78 will engage the conducting member 73 of its associated disc 70 to energize the relay 92, thereby to supply power to the "low speed" motor 46. The motor 46 will continue to drive the machine at "low speed" until the disc 70 associated with the brush 78 breaks contact, at which time the brush 76 will engage the conducting member 73 of its associated disc 69 to energize the relay 90 to supply power to the "medium speed" winding of the motor 47. The motor 47 will thereupon drive the apparatus at "medium speed" to the point where the brush 78 will again engage the conducting member 73 of its associated disc 70, whereupon the relay 90 will fall back, the relay 92 will be energized a second time to again drive the apparatus at "low speed" until the apparatus completes its cycle, at which point the brush 74 will again become effective at the beginning of another cycle.

A suitable variable speed device is indicated diagrammatically at 93 (Fig. 3) arranged along the main drive shaft 31 between the pulley 59 and the drive to the sequence or commutator switch 64 for the purpose of providing for a number of variations in the speed of operation of the machine in accordance with the type of articles being galvanized. By varying the speed of the shaft 31 by adjusting the device 93 no change in the cycle of speeds affected by the timing switch 64 will take place, but merely a slowing down or speeding up of the entire cycle of machine operation.

The automatic bath skimming and article discharge means 44 and 45, respectively, referred to hereinbefore as receiving motion from the shaft 40, when it is set in motion, will now be described.

Fixed to each end of the shaft 40 is a crank arm 95 each of which in the rotation of the shaft operates in unison similar mechanisms operatively connected to opposite ends of a skimmer blade 96. These mechanisms being similar, the mechanism at the forward end of the shaft 40, as viewed in Figs. 1 and 2, will be described. To the free end of the crank arm 95 is pivotally connected an irregularly shaped lever 97 which at its opposite end is pivotally connected at 98 to a horizontally slidable bar 99 guided in spaced stationary bearing brackets 100. Rigidly secured to and depending from the bar 99 is an arm 103 to the lower end of which is pivoted intermediate its ends a lever 104. The levers 97 and 104 are pivotally interconnected by a link 105 which at its lower end is connected to the right end of the lever 104, as viewed in Fig. 1 and at its upper end is connected to the lever 97 intermediate the ends thereof. At its left end the lever 104 is vertically bifurcated at 106. Attached to opposite ends of the skimmer blade 96 are angle shaped members 107 having their horizontal arms, which are of circular cross-section, pivotally supported in the bifurcated ends 106 of the levers 104.

The bath skimming means 44 (Figs. 1 and 2) is shown in its normal or inactive position, above the surface of and at the right side of the bath 11, ready to begin its operating cycle. Upon the immersed articles 30 reaching a predetermined point in their movement in the direction of the arrow across the bath, substantially the position shown in Fig. 1, the crank arms 95 are caused to make one revolution in a clockwise direction by mechanism to be described hereinafter. During the initial portion of their clockwise rotation the crank arms 95, referring to the broken line position of the skimming means, as shown in Fig. 4, raise the levers 97, which swing about their pivots 98 on the slidable bars 99 and through the links 105 interconnecting the levers 97 and 104 the latter are turned clockwise about their pivotal points on the arms 103 carried by the slidable bars. This movement of the crank arms 95 causes the levers 104 to move the pivotally supported skimmer blade 96 downwards to dip its lower edge into the metal of the bath a predetermined distance and also by means of the interconnecting levers 97 slide the bars 99 toward the left thus effecting a similar movement to the blade 96 while dipped below the surface of the bath. During the continued rotation of the crank arms 95 from the broken line position to the full line position Fig. 4, the dipped skimmer blade 96 is being drawn across the bath 11 and is partially raised to the position shown, its movement being faster than that of the articles 30, and as it nears the articles, where they almost meet, as shown in Fig. 5, its movement is reversed, its lower edge being first completely withdrawn from the bath and then moved to the right to the position shown in Fig. 1 to complete its operating cycle. Thus the surface of bath 11 is skimmed of dross by the blade 96 just before the articles 30 are raised from the bath.

The automatic discharge means 45 (Figs. 1 and 2) which removes the articles from the conveyor hooks 27 when they reach a predetermined point in their upward travel between the sprocket wheels 19 and 20, substantially the position thereof shown in Fig. 1, is shown in Figs. 1 and 2 in its normal or inactive position and during the hereinbefore referred to one revolution of the shaft 40 is actuated through a complete operating cycle by a pair of similar cams 110 fixed to the shaft 40. Each cam 110 operates in unison an identical leverage mechanism operatively connected to opposite ends of an article discharge platform 111 and the following description is of the leverage mechanism associated with the forward cam 110, as viewed in Figs. 1 and 2. The platform 111 is carried by a framework which includes at each end an arm 112 pivotally connected at its upper end to an arm 113 which is pivoted at its opposite end to a stationary bracket 114. Interconnecting the platform arms 112 below the arms 113 is a cross shaft 115 to which are pivoted the upper ends of levers 116 pivoted at their lower ends in brackets 117, the levers carrying rollers 118 which ride on the peripheral faces of the cams 110. As the shaft 40 begins its rotation, the cams 110 effect a quick clockwise rotation of the levers 116 about their pivots 117 from the position shown in Fig. 1 to that shown in Fig. 5. In this movement of the levers 116 the discharge platform 111 is moved outwards and simultaneously turned counterclockwise about the pivot shaft 115 due to the pivotal connection of the platform arms 112 at their upper ends to the arms 113 which swing about their pivots 114. The platform is then raised to the position shown in Fig. 5 and held there for a suitable period of time due to the cam rollers 118 riding on concentric peripheral faces of the cams 110.

As the discharge platform 111 quickly moves outwardly and upwardly, it engages the row of articles 30 suspended from the hooks 27 carried by the relatively slow travelling conveyor bar 25 and readily unhooks them therefrom, the articles being deposited on the platform, as shown in Fig. 5, when the platform reaches the position illustrated. It will be observed that the articles 30 are slightly inclined on the platform with the portions of the articles which last emerge from the bath 11 slightly higher than the portions thereof which first emerge from the bath. This position of the article is highly desirable since it permits any excess galvanized coating thereon to drain back along the articles and thereby make the coating more uniform. After the platform 111 has been held stationary in its raised position, due to the cam rollers 118 riding on the concentric peripheral faces of the rotating cams 110, for a sufficient length of time to allow the coating on the articles to harden or set the rollers ride into depressed cam face portions 119 of the cams 110 and the platform is returned to its normal position, as shown in Fig. 1. As the platform 111 returns to its normal position, and reaches the broken line position thereof (Fig. 1), the row of articles 30 are discharged automatically therefrom and move onto and down a stationary chute 120 (Figs. 1 and 2) and thence into a container (not shown) positioned at the lower end thereof. To prevent excessive friction of the rollers 118 on the cams 110 during the return movement of the discharge platform 111 suitable cushioning means such as a door check 121 carried on a bracket 123 and operatively connected to the cross shaft 115 interconnecting the platform arms 112 is provided.

The bath skimming means 44 and the article discharge means 45 at a predetermined point in the continuous travel of the conveyor 12 are set in motion from the shaft 40 by the tripping of a one revolution clutch mounted on the shaft 40 (Fig. 2) comprising a clutch member 124 rotatable with the sprocket wheel 39 which is normally freely rotatable on the shaft, the sprocket wheel being constantly driven by the sprocket chain 38. Cooperating with the clutch member 124 is a second clutch member 125 which is freely slidable longitudinally on the shaft 40 and fixed to rotate therewith by means of a key 126, the opposed faces of the clutch members being formed with the usual clutch teeth. The clutch member 125 is constantly urged into clutching engagement with the clutch member 124 by means of a spring 127 surrounding the shaft 40 and abutting at opposite ends a collar on the shaft and an end face of the clutch member. Formed in the periphery of the clutch member 125 is a continuous annular cam groove 128. The clutch members are normally held out of engagement by a pin 131, depending from a lever 132 pivoted on a bracket 133, the pin being entered in the cam groove 128 of the clutch member 125, as shown in Figs. 1 and 2, whereby the clutch member is held disengaged from the clutch member 124 against the action of the spring 127 tending to cause an engagement of the clutch members. To trip the clutch pin 131 the supporting lever 132 is pivotally connected at its free end to one end of an irregular shaped link 134 which is pivotally connected at its opposite end to a lever 135 pivoted to a supporting bracket 138. The right or free end (Figs. 1, 2 and 5) of the lever 135 lies in the path of the traveling conveyor cross bars 25 and every time a cross bar moves past the lever it is raised and permitted to fall back. The raising of the lever 135 by means of the interconnecting link 134 lifts the lever 132 carrying the clutch tripping pin 131, which is withdrawn from the cam groove 128 of the clutch member 125 and the latter is immediately moved into clutching engagement with the constantly rotating clutch member 124. Thus the shaft 40 to which the clutch member 125 is keyed begins its one revolution in the direction of the arrow (Fig. 1). When the lever 135 falls back the pin 131 again enters the cam groove 128 and as the shaft 40 nears the end of its revolution the pin rides onto a cam portion 139 of the groove 128 and effects a disengagement of the clutch members.

It is to be understood that the various machine elements described hereinbefore for effecting the operation of the machine have a definite motion transmitting ratio to each other and have been formed as well as arranged relative to each other to correctly time the periodic movements to be effected thereby.

It is believed, from the foregoing detailed description of the improved automatic galvanizing machine that the manner of continuously causing successive rows of articles 30 carried on the conveyor 12 to be moved into and through the bath 11, skimming the surface of the bath of dross before the articles are withdrawn therefrom, withdrawing the articles from the bath and discharging the articles from the conveyor and finally from the machine will be clearly apparent. However, a description of the particular points in the movement of the conveyor where the speed thereof is varied by the sequence switch 64 and the purpose of such speed variations has not been completely set forth but will be included in the following general description of operation of the machine.

It will be assumed, for the purpose of this general description, that the articles 30 to be galvanized are first fluxed and as the continuously moving conveyor carries a row of idle hooks 27 around the sprocket wheel 16 and moves to the right (Fig. 1) in the direction of the arrow toward the sprocket wheel 17, articles are placed on the hooks. After passing the sprocket wheel 17 the articles move downwardly, are immersed in the bath 11 and moved therethrough. The conveyor 12 while moving the immersed articles 30 through the bath is travelling at "high speed" which may, for example, be approximately twenty feet per minute, such movement being effected by the energization of the "high speed" windings of the motor 47, the circuit of which is controlled by the timing switch 64 in the manner previously described. When the immersed articles 30 reach substantially the position thereof, as shown in Fig. 1, the bath skimming means 44, hereinbefore described, is actuated to skim the surface of the bath of dross just before the articles are withdrawn therefrom.

Just before the articles begin their upward movement, out of the bath 11, at the sprocket wheel 19, the speed of the conveyor is changed from "high speed" to "low speed," in the manner previously described, which may, for example, be approximately two feet per minute, to slowly emerge the articles through the skimmed surface of the bath until the entire upper ends thereof are above the bath surface. This slow movement of the articles at this point is highly desirable since it does not permit excess galvanized coating to flow from the upper ends of the articles and along the length thereof in streaks or leave excessive lumps of coating near the edges, which would be the case if the articles were rapidly withdrawn, but permits the excess coating at the upper ends to drain back into the bath as the articles are slowly moved out of the bath. During the period when the middle portions of the articles are emerging from the bath the speed of the conveyor is changed from "low speed" to "medium speed" in the manner previously described, which may, for example, be approximately ten feet per minute, since the sides of the articles are all substantially vertical. Thus the operation of the machine may be speeded up at this point. As the lower ends of the articles approach the surface of the bath the speed of the conveyor is changed from "medium speed" to "low speed" in the manner previously described. This slow movement of the articles at this point is desirable for the same reasons that the upper ends of the articles are slowly withdrawn from the bath, that is, to permit the excess coating to drain from the articles back into the bath.

Upon the articles being entirely emerged from the bath the speed of the conveyor is changed from "low speed" to "high speed," in the manner previously described, thus causing a rapid upward movement of the vertically suspended articles toward the sprocket wheel 20. The purpose of this rapid movement of the articles after their complete emergence from the bath is to position them in a substantially horizontal position as soon as possible to prevent the coating from flowing to their lower ends and forming excessively thick sections. It is during this latter rapid movement of the articles that the article discharge means 45 is actuated. Referring to Fig. 1, the rapidly moving conveyor is shown with a conveyor bar 25, supporting a row of articles, approaching the sprocket wheel 20 and a short distance below the clutch tripping lever 135 which lies in the path of the conveyor bar. During the movement of the bar 25 past the lever 135 it is raised and then falls back to its normal position (Figs. 1 and 5). The one revolution clutch mounted on the shaft 40 is tripped by the raising of the lever 135 and the article discharge platform 111 is rapidly moved upwardly to remove the row of articles from the conveyor hooks 27 and deposit them on the platform in the position shown in Fig. 5. After a sufficient length of time to allow the coating on the articles to set the platform 111 is returned to its normal position (Fig. 1) and during such movement the articles are automatically discharged from the platform onto and thence down the chute 120. It will be observed that simultaneously with the operation of the article discharge means 45 that the bath skimming means 44 is being operated to skim the bath just prior to the row of articles, following the discharged row of articles, being withdrawn from the bath. Each succeeding row of articles 30 placed on the continuously moving conveyor 12 adjacent the sprocket wheel 16 is subjected to a similar sequence of handling operations at predetermined variable speeds and the bath 11 skimmed of dross just before each row of coated articles is withdrawn therefrom in the manner just described.

It will be apparent from the foregoing description that a simple and practical article coating machine is provided wherein successively conveyed articles are efficiently and expeditiously automatically subjected to a definite sequence of operations whereby a uniform and thorough coating thereof is effected.

Although this invention has herein been disclosed and described with special reference to a galvanizing or metal coating machine, it will be understood that it has other applications and that various modifications may be made therein without departing from the spirit and scope of the appended claims.

What is claimed is:

1. In an article coating machine, a receptacle for fluid coating material, means for continuously conveying an article, immersing it in the material and withdrawing it in a suspended position therefrom, a member arranged for movement from below and into engagement with the lower end face of the article after its withdrawal and during its continued advance to discharge the suspended article from said means, and means effective when the article immersing and discharging means has advanced a predetermined distance after withdrawal of the article to actuate the article discharge member.

2. In an article coating machine, a receptacle for fluid coating material, means for immersing an article in the material and withdrawing it in a suspended position therefrom, a pivotal member movable into engagement with the lower end of the article after its withdrawal for removing the suspended article from said means and thereafter supporting it upon its upper surface for a predetermined period of time with the portion thereof last withdrawn slightly higher than the portion first withdrawn and thereafter returning to its normal position said pivotal member in its return to normal position permitting the article to be discharged therefrom by the action of gravity, and means effective when the article immersing and withdrawing means has advanced a predetermined distance after withdrawal of the article to actuate the article removing and supporting member through its operating cycle.

3. In an article coating machine, a receptacle for fluid coating material, means for immersing an article in the material and withdrawing it in a suspended position therefrom, a member simultaneously movable in a plurality of directions to engage the lower end of the article after its withdrawal to lift it from said means and simultaneously supporting it upon its upper surface and carrying it outwardly from said means with the portion of the article last withdrawn slightly higher than the portion first withdrawn, means for moving the member at a rate of speed which is greater than that of the article, and means effective when the article immersing and withdrawing means has advanced a predetermined distance after withdrawal of the article to actuate the article lifting and supporting member.

4. In an article coating machine, a receptacle for fluid coating material, means for continuously conveying an article, immersing it in the material and withdrawing it therefrom, said means including a hook from which the article is suspended, a member simultaneously movable in a plurality of directions to engage the lower end of the moving article after its withdrawal to lift it from said hook and simultaneously supporting it upon its upper surface and carrying it outwardly from said conveying means, means for moving the member at a rate of speed which is greater than that of the article, said member in its return to normal position permitting the article to be discharged therefrom by the action of gravity, and means effective when the conveying means has advanced a predetermined distance after withdrawal of the article to actuate the article lifting and supporting member through its operating cycle.

5. In a metal coating machine, a receptacle for fluid coating metal, a pair of endless conveyors arranged above said receptacle, a plurality of elements extending between and pivotally supported at opposite ends on said conveyors, a plurality of alined hooks for the suspension of articles on each of said elements, means for directing said conveyors downwardly toward and across said receptacle and thence upwardly therefrom to immerse each successive row of articles in the coating metal, moving them therethrough and then withdrawing them through the surface thereof, means for continually advancing said conveyors and during such advance predeterminedly varying the speed thereof while each succeeding row of articles is being withdrawn, means for skimming the surface of the coating metal in advance of the withdrawal of each row of articles therethrough, a movable member engageable with the lower ends of each row of articles after their withdrawal for removing the suspended articles from the hooks and supporting them for a predetermined period of time with the portion last withdrawn slightly higher than the portion first withdrawn and thereafter returning to its normal position, the articles being automatically discharged from the member during its return movement, and means responsive to a predetermined position of the conveyor for operating said article discharge member and skimming means through their operating cycles.

6. In an article coating machine, a receptacle for fluid coating material, means for withdrawing an article immersed in the material through the surface thereof, means for operating said withdrawing means including an electric motor drive therefor, an operating circuit for said motor drive, and a continuously operated switch to control said operating circuit for effecting continuous operation of said motor drive at predetermined variable speeds and thereby the withdrawal of the article at such speeds.

7. In an article coating machine, a receptacle for fluid coating material, means for conveying successive articles and immersing them in the material and withdrawing them through the surface thereof, means for moving said conveying means including an electric motor drive therefor, an operating circuit for said motor drive, and a continuously operated switch driven from said motor drive to control said operating circuit for effecting continuous operation of said motor drive at predetermined variable speeds and thereby a continuous advance of said conveying means and during such advance predeterminedly varying the speed thereof while each succeeding article is being withdrawn.

8. In an article coating machine, a receptacle for fluid coating material, a conveyor adapted to have spaced articles suspended therefrom and in its advance movement to immerse the articles in succession in the material and withdrawing them through the surface thereof, means for moving said conveyor including an electric motor drive therefor, an operating circuit for said motor drive, and a continuously operated control switch driven from said motor drive to control said operating circuit for effecting continuous advance of said conveyor and during such advance predeterminedly varying the speed thereof while each article is being withdrawn to provide a slow withdrawal of the upper and lower ends of the article and a faster withdrawal of the portion thereof between the upper and lower ends.

9. In an article coating machine, a receptacle for fluid coating material, a conveyor, article supporting hooks spaced longitudinally along the conveyor and depending therefrom and in its advance movement to carry the articles downward to immerse them in the material, moving the immersed articles through the material and then withdraw them vertically through the surface thereof, means for moving said conveyor including an electric motor drive therefor, an operating circuit for said motor drive, and a continuously operated rotary control switch driven from said motor drive to control said operating circuit for effecting continuous operation of said motor drive at predetermined variable speeds and thereby a continuous advance of said conveyor and during such advance predeterminedly varying the speed thereof while each article is being withdrawn.

10. In an article coating machine, a receptacle for fluid coating material, means for immersing an article in the material and withdrawing it through the surface thereof, means for operating said article immersing and withdrawing means including an electric motor drive therefor, an operating circuit for said motor drive, a switch to control said operating circuit for effecting continuous operation of said motor drive at predetermined variable speeds and thereby the withdrawal of the article at such speeds, and a variable speed mechanism included in said motor drive for varying the speed of the entire operating cycle of the machine.

EDWARD BERTALAN.